United States Patent
Thiel et al.

(10) Patent No.: US 7,558,635 B1
(45) Date of Patent: Jul. 7, 2009

(54) CONTROL DEVICE AND CONTROL METHOD FOR FIXING AN INFORMATION OUTPUT ORDER FOR SEVERAL INFORMATION SOURCES, ESPECIALLY AUDIO SOURCES

(75) Inventors: Steffen Thiel, Langen (DE); Ralf Hahn, Mainz-Kastel (DE); Ute Gappa, Frankfurt (DE); Uwe Werner, Frankfurt (DE); Peter Lutz, Glashuetten (DE)

(73) Assignee: Robert Bosch GmbH, Stuttgart (DE)

( * ) Notice: Subject to any disclaimer, the term of this patent is extended or adjusted under 35 U.S.C. 154(b) by 1205 days.

(21) Appl. No.: 10/088,968

(22) PCT Filed: Sep. 5, 2000

(86) PCT No.: PCT/DE00/03048

§ 371 (c)(1),
(2), (4) Date: Jul. 10, 2002

(87) PCT Pub. No.: WO01/24136

PCT Pub. Date: Apr. 5, 2001

(30) Foreign Application Priority Data

Sep. 25, 1999 (DE) .............................. 199 46 022

(51) Int. Cl.
G06F 17/00 (2006.01)
H04R 27/00 (2006.01)
(52) U.S. Cl. .......................................... 700/94; 381/85
(58) Field of Classification Search ................. 700/94; 381/85, 86
See application file for complete search history.

(56) References Cited

U.S. PATENT DOCUMENTS 4,306,114 A * 12/1981 Callahan ..................... 381/119
4,513,284 A    4/1985  Right
4,742,348 A *  5/1988  Wagner ..................... 340/2.28
5,034,808 A    7/1991  Murray (Continued)

FOREIGN PATENT DOCUMENTS

DE        44 08 930        9/1995

(Continued)

OTHER PUBLICATIONS

Oda, Fumio, JP 09035461A, Feb. 7, 1997, JPO Machine Translation, Detailed Description pp. 1-10, Claims pp. 1-2, Drawing Decription, pp. 1-2, and Drawings pp. 1-5.*

(Continued)

*Primary Examiner*—Curtis Kuntz
*Assistant Examiner*—Daniel R Sellers
(74) *Attorney, Agent, or Firm*—Kenyon & Kenyon LLP

(57) ABSTRACT

A control device and a corresponding control method are provided for establishing an information-output ranking of a plurality of information sources, in particular audio sources. In order to output the information of the information sources to a common information-output device, the information-output ranking is established in pairs for the audio sources which is in the form of an audio-output matrix having a nonlinear order with respect to the matrix elements, and wherein each matrix element of the information-output matrix is used to determine the priority of a corresponding information source with respect to another information source. A conflict among competing information outputs is solved in this manner.

22 Claims, 3 Drawing Sheets

U.S. PATENT DOCUMENTS

| | | | |
|---|---|---|---|
| 5,054,022 A | | 10/1991 | van Steenbrugge |
| 5,243,640 A | * | 9/1993 | Hadley et al. ............ 455/426.1 |
| 5,574,514 A | | 11/1996 | Tanihira et al. |
| 5,722,069 A | * | 2/1998 | Donner ...................... 455/418 |
| 6,052,471 A | * | 4/2000 | Van Ryzin ................... 381/85 |
| 6,157,725 A | * | 12/2000 | Becker ........................ 381/86 |

FOREIGN PATENT DOCUMENTS

| | | |
|---|---|---|
| DE | 196 25 002 | 1/1998 |
| DE | 695 02 768 | 11/1998 |
| EP | 0 173 769 | 3/1989 |
| EP | 0 608 048 | 7/1994 |
| JP | 09035461 A * | 2/1997 |
| WO | WO 98/26958 | 6/1998 |

OTHER PUBLICATIONS

"Control Matrix for Parallel Processing Digital Computers in a Multi-Job Environment. Apr. 1982." IBM Technical Disclosure Bulletin, vol. 24, No. 11B, Apr. 1, 1982, pp. 5896-5897.

Philips Semiconductor Data Sheet, "TDA8540 4×4 Switch Matrix", Doc. No. 9397 747 20011, Feb. 6, 1995.

\* cited by examiner

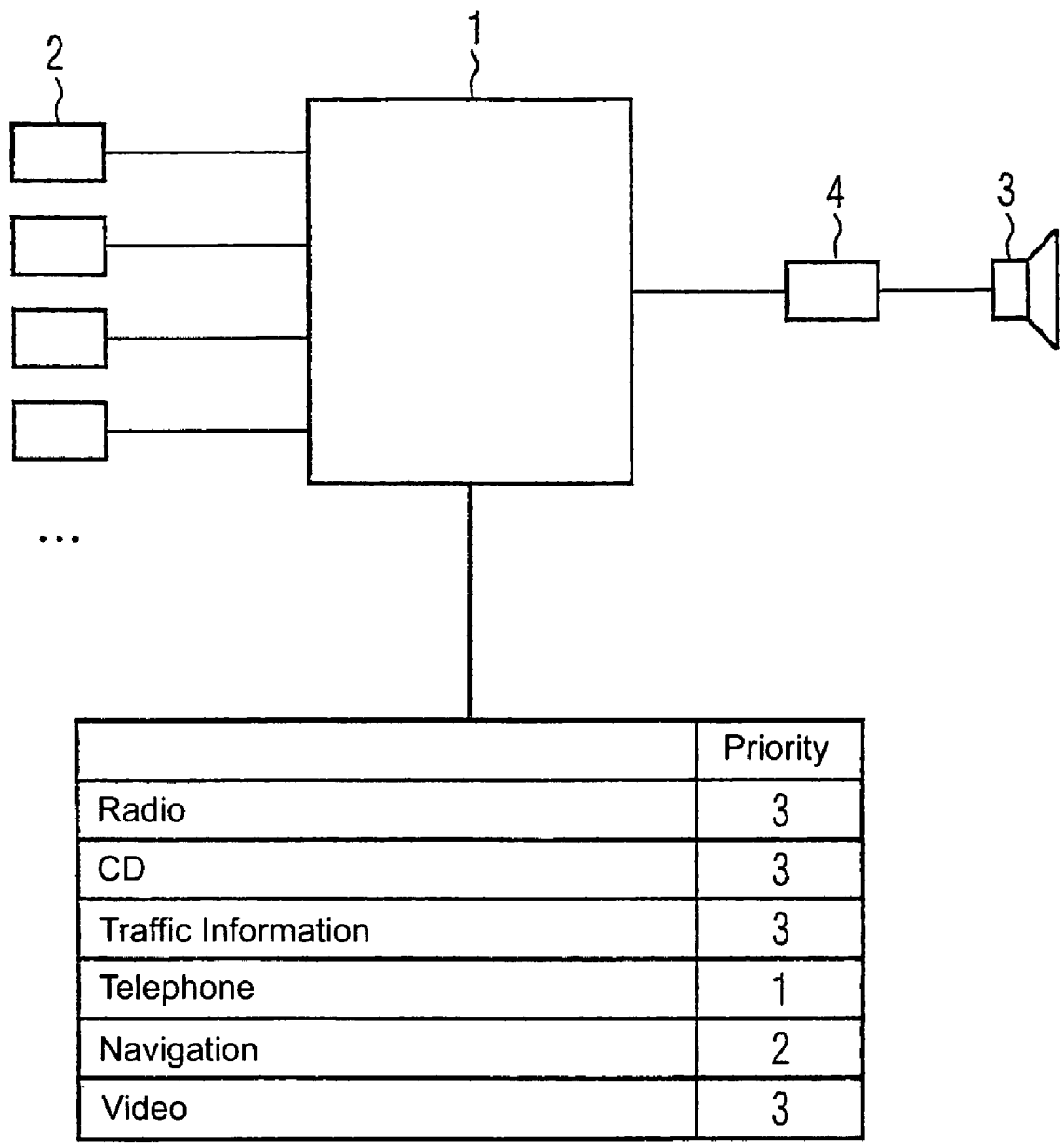

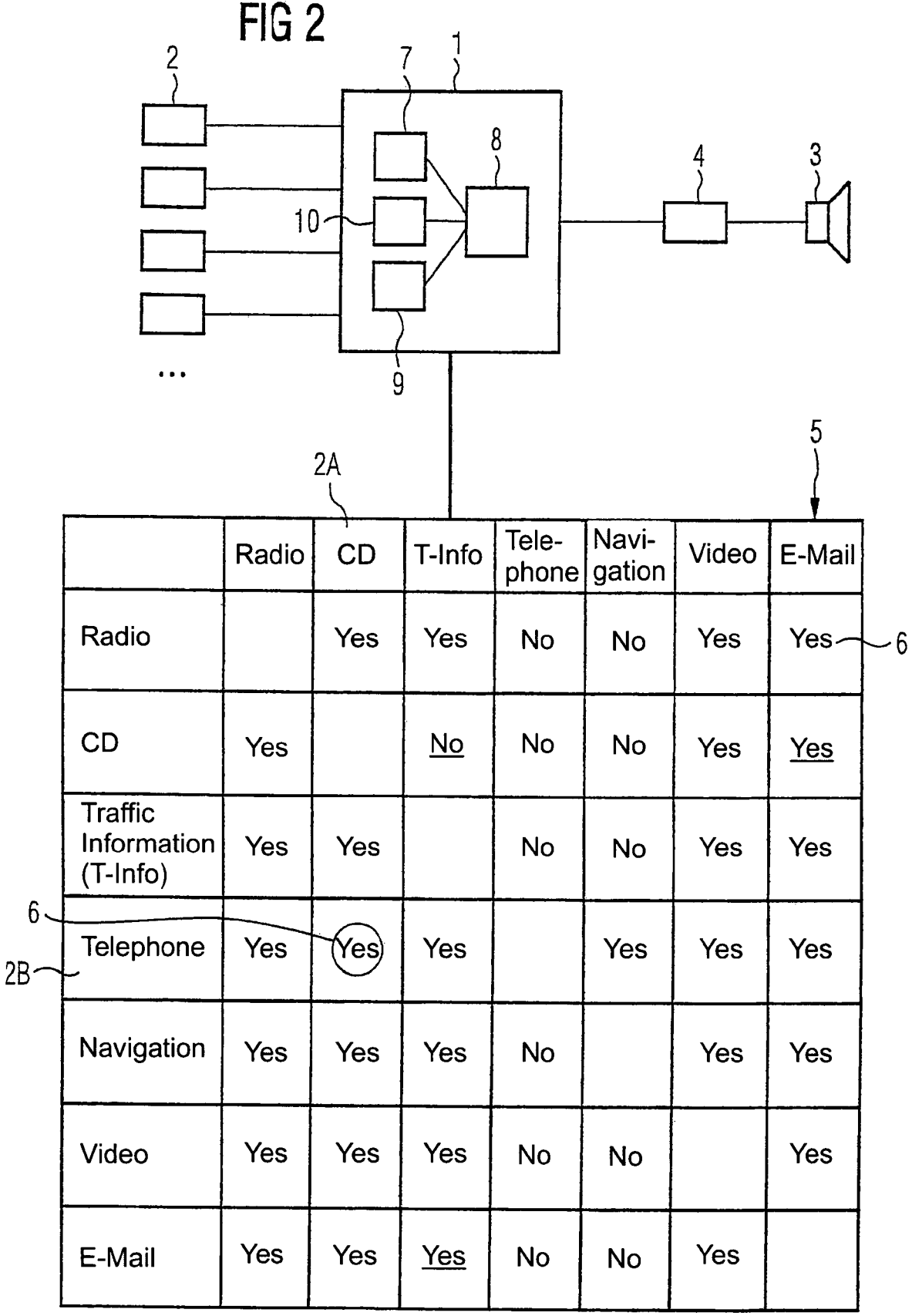

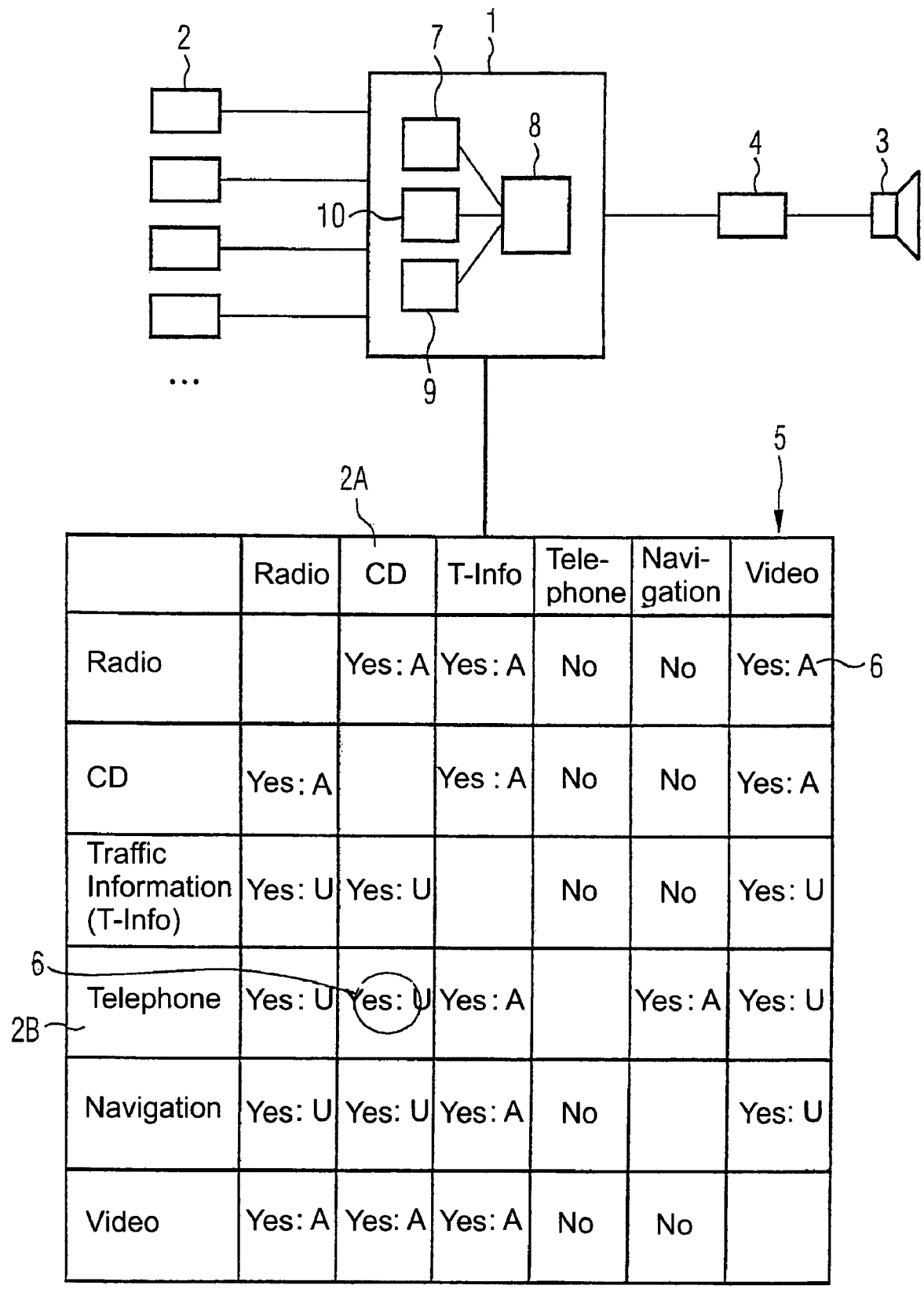

CONTROL DEVICE AND CONTROL METHOD FOR FIXING AN INFORMATION OUTPUT ORDER FOR SEVERAL INFORMATION SOURCES, ESPECIALLY AUDIO SOURCES

FIELD OF THE INVENTION

The present invention relates to a control device and a control method for establishing an information-output ranking of a plurality of information sources, in particular audio sources, in order to output the information of the information sources to a common information-output device.

BACKGROUND INFORMATION

Although applicable to any information sources and any information-output devices, the present invention and the problem forming the basis of it are explained with regard to audio sources and audio sinks, e.g. in an automobile.

In the case of a plurality of audio sources, e.g. audio devices such as a radio, CD player, navigation system, etc., one requires a mechanism which coordinates the release of audio-data output or audio-information output, e.g. music, voice output, video tone, etc., for each audio sink, e.g. loudspeakers, headphones, etc.

This mechanism must establish which audio source may execute an output when a plurality of audio sources want to send an audio output to an audio sink at the same time, e.g. when the audio sink is already busy when a new inquiry is subsequently made.

Known methods are primarily based on a priority control system, in which each audio source has a static priority. Audio sources having the same or higher priority interrupt each other, i.e. if an audio output of an audio source having, for example, a priority of 3 is made, this audio output is interrupted by an output of an audio source B having a priority of at least 3, but is not affected by an audio source C having a priority of less than 3.

The problem of a simple priority control is that more complex operations can no longer be carried out. In simple priority control, the order of audio-source interruption is linear, i.e. if audio source A interrupts audio source B and audio source B interrupts audio source C, then audio source A also interrupts audio source C. However, this is sometimes not desirable, since, in the example just mentioned, the intention may be for audio source A to indeed interrupt audio source B, but not interrupt audio source C.

SUMMARY OF THE INVENTION

The present invention's control device and the corresponding control method have the following advantages over the related art:

Substantially more ways of solving conflicts may be implemented by the device of the present invention, than by the priority-controlled method, i.e. the method of the present invention is considerably more flexible.

The method of the present invention may be specified more easily, since, in each case, one anticipates all situations by explicitly comparing two competing audio sources. In particular, the user may easily produce his or her individual configuration.

When a conflict situation between two audio sources is modified, it is always necessary to make just one local change in the present invention, while, in the case of priority control according to the related art, all of the other priorities must change as well. The latter also applies to adding new audio sources.

The idea forming the basis of the present invention is that the information-output ranking, which is in the form of an audio-output matrix having a nonlinear order with regard to the matrix elements, is established in pairs for the audio source; and that each matrix element of the audio-output matrix determines the priority of a corresponding audio source with respect to another audio source.

Thus, each audio-source pair may be assigned a corresponding matrix element, which sets the priority with respect to this audio-source pair. All in all, an information-output ranking is determined by the information-output matrix and the priority of a corresponding information source with respect to another information source.

A further exemplary embodiment of this invention provides for a selection device for selecting different attributes, which are assigned to a matrix element of an audio-source pair. In this manner, it can be chosen whether a new audio source relieves the old audio source or just temporarily interrupts it, whether an abrupt transition or a smooth transition with cross-fading is produced between the two audio sources, or whether the two audio sources are "switched off", i.e. whether both outputs occur simultaneously through superpositioning, which, for example, makes sense in the case of a voice output and music output.

According to a further exemplary embodiment of this invention, an input device is provided for inputting the matrix elements together with the selected attributes. This input device allows the user to select a specific configuration himself.

A further exemplary embodiment of this invention provides for the control device having a video screen. This allows the presently set configuration to be easily seen, and any change to this configuration may be represented online.

A further exemplary embodiment of this invention provides a storage device for storing the inputted matrix elements. In this manner, the individually set configuration is even retained when the control device is separated from the current supply, and the desired configuration does not need to be re-input when the control device is switched on again.

A further exemplary embodiment of this invention provides a management device for managing a series of audio sources in a queuing list. This management device manages the audio sources that are still waiting. When, for example, an audio source has ended its output, then the topmost audio-source inquiry of the agenda is subsequently activated. In response to a new audio-source inquiry, which "beats" the active audio source, i.e. relieves or interrupts it, then the audio source active up to that point is placed at the top of the agenda. When the new audio source does not "beat" the active audio source, then the new audio source "seeps" into the agenda from above, i.e. it is filed away at the position at which it "beats" the next audio source. This management device allows audio sources to extract their status at any time and withdraw their request at any time, if it is no longer current after a certain period of time.

A further, preferred embodiment of this invention provides for the audio sink to be in the form of either a loudspeaker or a head phone.

BRIEF DESCRIPTION OF THE DRAWINGS

FIG. 1 shows a block diagram of an audio-output system having a plurality of audio sources connected to an audio sink, and having a priority-control system according to the related art, which is represented as a priority table.

FIG. 2 shows a block diagram of an audio-output system, having a plurality of audio sources connected to an audio sink, and having a control system represented as a matrix, as an exemplary embodiment of the present invention.

FIG. 3 shows a block diagram of an audio-output system, having a plurality of audio sources connected to an audio sink, and having a control system represented as a matrix, as a further exemplary embodiment of the present invention.

DETAILED DESCRIPTION

FIG. 1 shows a method according to the related art, which represents a priority-controlled method. In the case of a priority-controlled method, each audio source 2 is assigned a static priority. Audio sources 2 having the same or higher priority interrupt each other. The following behavior may be produced from the priority table represented in FIG. 1:

An audio telephone output is never "beaten", i.e. relieved or interrupted, by any other output source, an audio navigation output is only "beaten" by an audio telephone output, while radio, CD, traffic information, and video have quasi-equal access and beat each other in each case. This produces a certain order for relieving or taking over audio sources, because an audio telephone output "beats" a navigation output, and this navigation output in turn "beats", for example, a CD output, which therefore means that a telephone output also "beats" the CD output.

As an exemplary embodiment of the present invention, FIG. 2 illustrates a block diagram of an audio-output system, in which a plurality of audio sources 2, such as a radio, CD player, navigation systems, etc., are connected, via an amplifier 4, to an audio sink 3, such as a loudspeaker or head phone. FIG. 2 also illustrates a control device as an exemplary embodiment of the present invention.

In the presence of several audio sources 2, such as in an automobile, one needs a control device 1, which coordinates the release of the audio-data output, such as music, voice outputs, video tone, etc., for the specific audio sinks 3, such as loudspeakers or headphones. This control device must stipulate, which audio source 2 may make an output, if a plurality of audio sources 2 wants to simultaneously send an audio output to one audio sink 3, or if audio sink 3 is already busy when a new request subsequently occurs.

The control device is connected between audio sources 2 and common audio sink 3 and includes an input device 9 for inputting a decision that specifies which source 2 "beats" another. In other words, one describes the conflict solution along the lines of situations, in which a source 2A of audio sources 2 is currently active when a new request from another source 2B of audio sources 2 is registered.

Using this input device 9, each audio-source pair 2A, 2B may be individually assigned a priority, which is only valid for this audio-source pair 2A, 2B.

The material described above is explained in detail, using the example represented in FIG. 2. In this example, audio source 2A, in this case a CD player, is active, i.e. audio sink 3 is already occupied by the audio output of the CD player (source 2A). If a new request of an audio source 2B for outputting audio on the same audio sink 3 is made, the audio output of source 2A (CD player) of matrix 5 is then "beaten" by the audio output of source 2B (telephone) of the row of matrix 5, when the table entry or matrix element 6 is "yes". If matrix element 6 of audio-source pair 2A, 2B is "no", then the audio source 2 up to this point continues to transmit its audio data to audio sink 3.

Thus, using input device 9, an individual decision matrix may be set up, and an information-output ranking having a nonlinear order with respect to matrix elements 6 may be established in pairs for audio sources 2. The underlined entries in audio-output matrix 5 in FIG. 2 illustrate the following example of this specific embodiment of the present invention.

An audio output of a traffic-information item (V-Info) to audio sink 3 is "beaten" by a new e-mail message output to the same audio sink 3. This is determined by corresponding matrix element 6, "yes". An e-mail message is in turn "beaten" by an audio output of a CD player to the same sink 3. However, this does not mean that the audio output of the CD player "beats" a previous output of a traffic-information item (V-Info), because corresponding matrix element 6 was determined to be "no", and this has the effect that previous audio source 2A is not "beaten" by new audio source 2B.

When an audio source 2 has ended its audio output, the control device activates another audio-source request. To this end, an agenda including audio sources 2 that are still "waiting" is managed by a management device, i.e. a priority ranking is generated, the topmost audio-source request of the agenda being activated, when an audio source 2 has ended its audio output. Upon reception of a new request of an audio source 2B, which "beats" active audio source 2A, the audio source 2A active up to this point is placed at the top of the agenda. If a new request of an audio source 2B is received, which does not "beat" active audio source 2A, it is taken from the top of the agenda and filed away at the position at which it displaces the next audio source. The control device allows audio sources 2 to change their current status at any time and also withdraw their request, if it is no longer current after a certain period of time.

The control device 1 also has a storage device 10, which stores inputted matrix elements 6 in audio-output matrix 5.

A selection device 7 is provided for selecting different attributes, which are assigned to the matrix element 6 of an information-source pair 2A, 2B.

A video screen 8 for viewing the present configuration is provided in the control device. Thus, the user may look at his current setting at all times, and change it according to his idea, using input device 9.

FIG. 2 also describes a method for establishing an information-output ranking of a plurality of audio sources 2. In order to output information of audio sources 2 to a common audio sink 3, the information-output ranking is established in pairs for audio sources 2, as an audio-output matrix 5 having a nonlinear order with respect to matrix elements 6, and each matrix element 6 of audio-output matrix 5 determining the priority of a corresponding audio source 2B with respect to another audio source 2A, as an exemplary embodiment of the present invention.

An information-output ranking of several audio sources 2 is determined by a matrix-based method, in which it may be specified, which audio source 2B displaces another audio source 2A. The conflict solution is described along the lines of the situations, in which an audio source 2A is currently active when a new request of another audio source 2B is logged in.

In this exemplary embodiment of the present invention, either the removal of the previous audio source 2A by the newly arriving audio source 2B, or the continuation of the output of present audio source 2A, is given as a criterion for the priority between 2 audio sources at a time. These situations are described by matrix elements 6, as "yes" or "no".

Each audio-source pair 2A, 2B is initially assigned a corresponding matrix element 6 in audio-output matrix 5, using input device 9. Audio sources 2A of the columns denote the currently active audio sources. Audio sources 2B of the rows denote the newly added audio sources. In this manner, the specific matrix element establishes, depending on if the table entry is "yes" or "no", whether or not an audio source 2A in the column that is currently active, i.e. that is currently outputting audio to a certain audio sink 3, is "beaten" by an audio source 2B of the row that has newly arrived, i.e. by an audio source that sends an audio output to the same audio sink 3. When the table entry is "yes", newly arrived audio source 2B becomes active, but when the table entry is "no", then present audio source 2A continues to transmit its audio data to audio sink 3.

In the example, which is shown in FIG. 2 and has the underlined matrix elements 6 of the present invention's exemplary embodiment, an audio CD-player output displaces an audio e-mail output, and an audio e-mail output displaces an audio traffic-information output, since the corresponding table entry is "yes", but an audio traffic-information output is not displaced by an audio CD-player output, since the table entry is "no".

The matrix elements 6 input into output matrix 5 in this manner are stored by a storage device 10. This even allows the user-defined configuration to be retained in the event of the device being separated from the current supply, and the configuration does not have to be re-input the next time the device is used.

Using a management device, a sequence of all active audio sources 2 is formed from respective matrix elements 6. When the output of the audio source 2A outputted to audio sink 3 is ended, the topmost audio-source request of the agenda formed by the management device is activated. When a new request of an audio source 2B is received, which "beats" active audio source 2A, the audio source 2A active up to this point is placed on the top of the agenda. When a new request of an audio source 2B is received, which does not "beat" active audio source 2A, the request "seeps" into the agenda from above, i.e. it is filed away at the position at which it "beats" the next audio source 2. Audio sources 2 may change their status at all times and also withdraw their request, if it is no longer current after a certain period of time.

For example, an audio CD is being played in an automobile. The playing of the CD is interrupted by the higher audio traffic-information output. During the output of the traffic information, a telephone call is received which in turn interrupts the audio output of the traffic information, since the telephone call has a higher audio-output priority than the traffic information. After the telephone call, the system switches back to the radio traffic-information announcement, if it has not yet ended, since it is in the topmost position in the agenda. After the radio traffic-information announcement has ended, the CD player continues to play the CD, since it now assumes the topmost place in the ranking list of the agenda.

FIG. 3 shows a further exemplary embodiment of the present invention. As described above, matrix elements 6 of information-output matrix 5, which are input using input device 9, establish an information-output ranking of a plurality of audio sources 2 on a common audio sink 3. In this exemplary embodiment of the present invention, each matrix element 6 assigns corresponding audio-source pair 2A, 2B the criterion, whether new audio source 2B relieves previous audio source 2A, characterized by the matrix element "yes: A", or just temporarily interrupts it, characterized by the matrix element "yes:U", or whether previous source 2A is not displaced, characterized by the matrix element "no".

During the playback of entertainment sources such as radio, CD, and video, this allows one to switch back again to the entertainment source after it has been taken over by an information source such as traffic information, navigation, or telephone.

In a further embodiment of the present invention, matrix element 6 of audio-output matrix 5 has the property "abrupt transition" versus "smooth transition". This attribute, which is assigned to an audio-source pair 2A, 2B, allows one to select, in the case of a "beating", whether an abrupt transition or a smooth transition with cross-fading is produced between two audio sources 2A, 2B, i.e. audio source 2A is slowly faded out while audio source 2B is slowly faded in.

In a further embodiment of the present invention, matrix element 6, which belongs to audio-output matrix 5 and is assigned to an audio-source pair 2A, 2B, has the property of "separation" versus "superposition". This attribute enables one to select, whether the two audio sources 2A and 2B are "superimposed", i.e. the two audio outputs occur simultaneously through superpositioning, e.g. in the case of a voice output and music output, or whether the two outputs of the two audio sources 2A and 2B occur separately from each other.

Although the present invention was described above on the basis of preferred exemplary embodiments, the method is not limited to these, but may be modified in various ways.

In particular, the above-mentioned attributes of matrix elements 6 of the explained exemplary embodiments according to the present invention may be combined or supplemented with other, additional attributes, which are useful by themselves or useful when added to the previous attributes.

What is claimed is:

1. A control device comprising:
a storage device for storing an audio-output matrix having a plurality of matrix elements, each matrix element associated with a pair of audio sources from a plurality of different audio sources, including at least first, second and third matrix elements, wherein the first matrix element indicates if a first audio source can interrupt a second audio source, the second matrix element indicates if the second audio source can interrupt a third audio source, and the third matrix element indicates if the third audio source can interrupt the first audio source; and
an arrangement for outputting a selected one of the plurality of audio sources to a common output device,
wherein the control device is configured to manage audio output interruption requests from the plurality of different audio sources as a function of the matrix elements of the audio-output matrix, wherein the managing includes a non-linear mode in which, if indicated by the matrix elements, the first audio source can interrupt the second audio source, the second audio source can interrupt the third audio source, and the third audio source can interrupt the first audio source.

2. The control device as recited in claim 1, further comprising a selection device for selecting different attributes which are assigned to the matrix elements of an audio source pair.

3. The control device as recited in claim 2, further comprising an input device for inputting the matrix elements together with the selected attributes.

4. The control device as recited in claim 1, further comprising a video screen.

5. The control device as recited in claim 1, further comprising a management device for managing the plurality of audio sources in a waiting list.

6. The control device as recited in claim 1, wherein the common output device is at least one of a loudspeaker and a headphone.

7. The control device of claim 1, wherein each matrix element indicates the interruption priority of a particular audio source, of the plurality of different audio sources, with respect to another audio source of the plurality of different audio sources.

8. The control device of claim 1, wherein each matrix element includes an attribute indicating a manner of interruption of a higher priority one of the two associated audio sources with respect to a lower priority one of the two associated audio sources.

9. The control device of claim 8, wherein the manner of interruption selects between a new audio source relieving a previous audio source or the new audio source temporarily interrupting the previous audio source.

10. The control device of claim 8, wherein the manner of interruption selects between an abrupt transition from a previous audio source to a new audio source or a smooth transition from the previous audio source to the new audio source.

11. The control device of claim 8, wherein the manner of interruption indicates whether a new audio source is superimposed on a previous audio source.

12. The control device of claim 1, wherein the plurality of different audio sources are audio portions of a plurality of different information sources.

13. A control method comprising:
   storing an audio-output matrix having a plurality of matrix elements, each matrix element associated with a pair of audio sources from a plurality of different audio sources, including at least first, second and third matrix elements, wherein the first matrix element indicates if a first audio source can interrupt a second audio source, the second matrix element indicates if the second audio source can interrupt a third audio source, and the third matrix element indicates if the third audio source can interrupt the first audio source;
   outputting a selected one of the plurality of audio sources to a common output device; and
   managing audio output interruption requests from the plurality of different audio sources as a function of the matrix elements of the audio-output matrix, wherein the managing includes a non-linear mode in which, if indicated by the matrix elements, the first audio source can interrupt the second audio source, the second audio source can interrupt the third audio source, and the third audio source can interrupt the first audio source.

14. The control method as recited in claim 13, further comprising selecting different attributes of the matrix elements which are each assigned to an audio source pair.

15. The control method as recited in claim 13, further comprising individually entering into an input device the matrix elements of the audio-output matrix.

16. The control method as recited in claim 13, further comprising the step of selecting, based on an attribute of a matrix element assigned to an audio source pair, between relieving and interrupting the corresponding audio source that is active longer.

17. The control method as recited in claim 13, further comprising selecting between an abrupt transition and a smooth cross-fading between two audio sources.

18. The control method as recited in claim 13, further comprising selecting between separating and superposing two corresponding audio sources.

19. The control method as recited in claim 13, further comprising forming a waiting list having an order of the audio sources, using attributes of the respective matrix elements.

20. The control method of claim 13, wherein the plurality of different audio sources are audio portions of a plurality of different information sources.

21. The control method of claim 13, further comprising:
   selecting different attributes of the matrix elements which are each assigned to an audio source pair;
   individually entering into an input device the matrix elements of the audio-output matrix;
   performing at least one of:
      selecting, based on an attribute of a matrix element assigned to an audio source pair, between relieving and interrupting the corresponding audio source that is active longer;
      selecting between an abrupt transition and a smooth cross-fading between two audio sources;
      selecting between separating and superposing two corresponding audio sources; and
      forming a waiting list having an order of the audio sources, using attributes of the respective matrix elements.

22. The control method of claim 21, wherein each of the matrix elements includes an attribute indicating a manner of interruption of a higher priority one of the two associated audio sources with respect to a lower priority one of the two associated audio sources.

* * * * *